United States Patent
Zohar et al.

(10) Patent No.: US 7,500,063 B2
(45) Date of Patent: Mar. 3, 2009

(54) METHOD AND APPARATUS FOR MANAGING A CACHE MEMORY IN A MASS-STORAGE SYSTEM

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: XIV Ltd., Tel-Aviv (IL)

(*) Notice: Subject to any disclaimer, the term of this patent is extended or adjusted under 35 U.S.C. 154(b) by 262 days.

(21) Appl. No.: 11/302,096

(22) Filed: Dec. 12, 2005

(65) Prior Publication Data

US 2006/0112232 A1 May 25, 2006

Related U.S. Application Data

(63) Continuation-in-part of application No. 10/914,746, filed on Aug. 9, 2004.

(60) Provisional application No. 60/639,780, filed on Dec. 29, 2004.

(51) Int. Cl.
*G06F 12/00* (2006.01)

(52) U.S. Cl. ........................ 711/137; 711/113

(58) Field of Classification Search .................. 711/113, 711/137
See application file for complete search history.

(56) References Cited

U.S. PATENT DOCUMENTS

| | | | |
|---|---|---|---|
| 5,682,500 A | | 10/1997 | Vishlitzky et al. |
| 6,098,153 A | * | 8/2000 | Fuld et al. .................... 711/134 |
| 6,134,643 A | * | 10/2000 | Kedem et al. ................ 711/213 |
| 6,789,171 B2 | * | 9/2004 | Desai et al. .................. 711/137 |
| 7,039,766 B1 | * | 5/2006 | Smith .......................... 711/137 |
| 2003/0225977 A1 | * | 12/2003 | Desai et al. .................. 711/137 |
| 2006/0041723 A1 | * | 2/2006 | Hakura et al. ............... 711/137 |

* cited by examiner

*Primary Examiner*—Kevin L Ellis
*Assistant Examiner*—Jared I Rutz
(74) *Attorney, Agent, or Firm*—Katten Muchin Rosenman LLP

(57) ABSTRACT

Some embodiments of the present invention relate to a method and a circuit for managing the prefetching of data into a cache. According to some embodiments of the present invention a prefects controller may be adapted to trigger a prefetch operation for prefetching one or more data segments into the cache together with at least one segment to be fetched, and may be further adapted to establish a number of data segments to be prefetched together with the at least one segment to be fetched. According to some embodiments of the present invention, the prefetch controller may be adapted to establish what number of segments are to be prefetched at least in accordance with the number of successive segments, including one, already in the cache, which are spaced apart by no more than a predetermined number of segments relative to the at least one segment to be fetched.

12 Claims, 3 Drawing Sheets

METHOD AND APPARATUS FOR MANAGING A CACHE MEMORY IN A MASS-STORAGE SYSTEM

CROSS REFERENCE TO RELATED APPLICATION

This application claims priority from U.S. Provisional Patent Application No. 60/639,780, filed Dec. 29, 2004, which is hereby incorporated by reference in its entirety. In addition, this application is a Continuation In Part of U.S. patent application Ser. No. 10/914,746 filed on Aug. 9, 2004.

FIELD OF THE INVENTION

The present invention relates generally to the field of digital memory storage. More specifically, the present invention relates to a method, a computer program product and circuit for retrieving data into a cache memory from a mass data storage device.

BACKGROUND OF THE INVENTION

A data storage system is typically able to service "data write" or "data read" requests issued by a host computer. A host may be connected to the storage system's external controller or interfaces (IF), through various channels that transfer both data and control information (i.e. control signals). Physical non-volatile media in which data may be permanently or semi-permanently stored include arrays of disk devices, magnetic or optical, which are relatively less expensive than semiconductor based volatile memory (e.g. Random Access Memory) but are relatively much slower in being accessed.

A cache memory is a high-speed buffer located between an IF and the disk device(s), which is meant to reduce the overall latency of Input/Output activity between the storage system and a host accessing data on the storage system. Whenever a host requests data stored in a memory system, the request may be served with significantly lower latency if the requested data is already found in cache, since this data does not have to be brought from the disks. As of the year 2004, speeds of IO transactions involving disk activity are typically on the order of 5-10 milliseconds, whereas IO speeds involving cache (e.g. RAM memory) access are on the order of several nanoseconds.

The relatively high latency associated with disk activity derives from the mechanical nature of the disk devices. In order to retrieve requested data from a disk based device, a disk controller must first cause a disk reading arm to physically move to a track containing the requested data. Once the head of the arm has been placed at the beginning of a track containing the data, the time required to read the accessed data on the relevant track is relatively very short, on the order of several microseconds.

One criterion or parameter which is often used to measure the efficiency of a cache memory system or implementation is a criterion referred to as a hit ratio. A hit ratio of a specific implementation is the percentage of "data read" requests issued by the host that are already found in cache and that consequently did not require time intensive retrieval from disk operations. An ideal cache system would be one reaching a 100% hit ratio. One way known in the art to improve performance by means of enhancing the hit ratio, includes implementing intelligent algorithms that attempt to guess in advance which portions of data stored on a disk device will soon be requested by a host. Once it has been estimated/ guessed that some specific data will soon be requested, in anticipation of the request, the algorithm(s) "prefetch" the data into the cache, prior to actually receiving a request for the data.

Prefetch algorithms known in the art commonly fall into one of two categories. The first category or group includes algorithms which are based on the identification of sequential streams of read requests. If the storage system, or the cache management module therein, is able to identify that the host is issuing such sequential streams it may then assume that this kind of activity will be maintained for some time, and accordingly, it will guess which additional portions of data will be requested by the host in the near future. The anticipated portions are thus sent to the cache in advance. U.S. Pat. No. 5,682,500 to Vishlitzky, et al. describes such a prefetch method. The method disclosed by Vishlitzky, et al. involves significant overhead for both triggering the prefetch task and for determining the amount of data to be prefetched as part of each prefetch task.

A second group of prefetch algorithms includes algorithms which are based on the identification of "hot zones" in the storage system. That is, a statistical analysis of activity in the system may indicate that a certain area, defined in advance as a potential "hot zone", is being intensely addressed by a host, and consequently, a mechanism may be triggered to bring into cache all the data contained in that "hot zone". The underlying assumption is that such data portions tend to be addressed in their totality, or in their majority, whenever they are addressed over a certain threshold of focused activity.

Unfortunately, in order to increase the cache's hit ratio, the current approaches to prefetch algorithms require a considerable investment in terms of computational resources. In accordance with current prefetch techniques, considerable resources are invested in each of the following tasks: (1) monitoring activity within the storage system (including the cache, disk(s) and possibly also the IFs) on an ongoing basis; (2) determining which data to prefetch; and (3) implementing the desired prefetch policy in a coordinated manner across the system.

There is a need for a method of implementing prefetch operations requiring a relatively small amount of computational and resource overhead while providing for a substantially high cache hit-ratio, and for a device for implementing same. There is a further need for such a method which is based upon a relatively straightforward prefetch criterion in accordance with which variable amounts of data are prefetched depending upon the amount of data meeting the prefetch criterion, and for a device for implementing same. There is yet a further need for such a method which is based upon a substantially flexible prefetch criterion which is configured to accommodate for various cache related statistical deviations.

SUMMARY OF THE INVENTION

Some embodiments of the present invention relate to a method, a computer program product and a circuit for managing the prefetching of data into a cache. According to some embodiments of the present invention a prefetch controller may be adapted to trigger a prefetch operation for prefetching one or more data segments into the cache together with at least one segment to be fetched, and may be further adapted to establish a number of data segments to be prefetched together with the at least one segment to be fetched. According to some embodiments of the present invention, the prefetch controller may be adapted to establish what number of segments are to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched. According to further embodiments of the present invention, the prefetch controller may be adapted to establish what number of segments are to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched, on condition that there is no other one or more segments which are closer relative to the at least one segment to be fetched than the consecutive segments or than the single segments, if any, already in the cache, which are spaced apart by no more than a predetermined number of segments relative to the at least one segment to be fetched.

According to further embodiments of the present invention, the prefetch controller may be adapted to establish what number of segments are to be prefetched further in accordance with the number of segments already in the cache, which are contiguous with the at least one segment to be fetched.

In accordance with some embodiments of the present invention, the prefetch controller may be adapted to establish the number of segments to be prefetched in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched and in accordance with the number of segments already in the cache, which are contiguous with the at least one segment to be fetched.

In accordance with some embodiments of the present invention, the prefetch controller may be adapted to establish which data segments are to be prefetched.

In accordance with some embodiments of the present invention, the prefetch controller may be adapted to trigger the prefetch operation in accordance with a predefined prefetch trigger. According to further embodiments of the present invention, the predefined prefetch trigger may be compatible with a prefetch criterion or criteria used for establishing the number of segments to be prefetched. According to yet further embodiments of the present invention, the prefetch trigger may be configured to trigger a prefetch task in case it is determined that there is at least one segment in the cache which is spaced apart by no more than a predetermined number of segments relative to the at least one segment to be fetched.

In accordance with some embodiments of the present invention, the prefetch controller may be adapted to establish that for each segment meeting a criterion or criteria used for establishing the number of segments to be prefetched, a predefined number of segments are to be prefetched.

In accordance with some embodiments of the present invention, the prefetch trigger may be configured to trigger a prefetch task only in case it is determined that there is at least a predefined number of data segments meeting the criterion or criteria used for establishing the number of segments to be prefetched.

In accordance with some embodiments of the present invention, the relation between data segments may be determined in accordance with indicia associated with each of the data segments.

In accordance with further embodiments of the present invention, a method of managing the prefetching of data into a cache may include triggering a prefetch operation for prefetching one or more data segments into the cache together with at least one segment to be fetched, and establishing which segments are to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched.

In accordance with yet further embodiments of the present invention a computer program product comprising a computer useable medium having computer readable program code embodied therein for managing the prefetching of data into a cache may include a computer readable program code for causing the computer to trigger a prefetch operation for prefetching one or more data segments into the cache together with at least one segment to be fetched, and a computer readable program code for causing the computer to establish which segments are to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched.

According to further embodiments of the present invention, there is provided a method of managing the prefetching of data into a cache including triggering a prefetch operation for prefetching one or more data segments into the cache together with at least one segment to be fetched, and establishing what number of segments are to be prefetched at least in accordance with the number of successive segments, if any, already in the cache which are spaced apart by no more than a predetermined number of segments relative to the at least one segment to be fetched.

Further embodiments of the present invention relation to a circuit for managing the prefetching of data into a cache, including a prefetch controller. The prefetch controller may be adapted to trigger a prefetch operation for prefetching one or more data segments into the cache together with at least one segment to be fetched. The prefetch controller may be further adapted to establish what number of segments are to be prefetched at least in accordance with the number of successive segments, if any, already in the cache which are spaced apart by no more than a predetermined number of segments relative to the at least one segment to be fetched.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
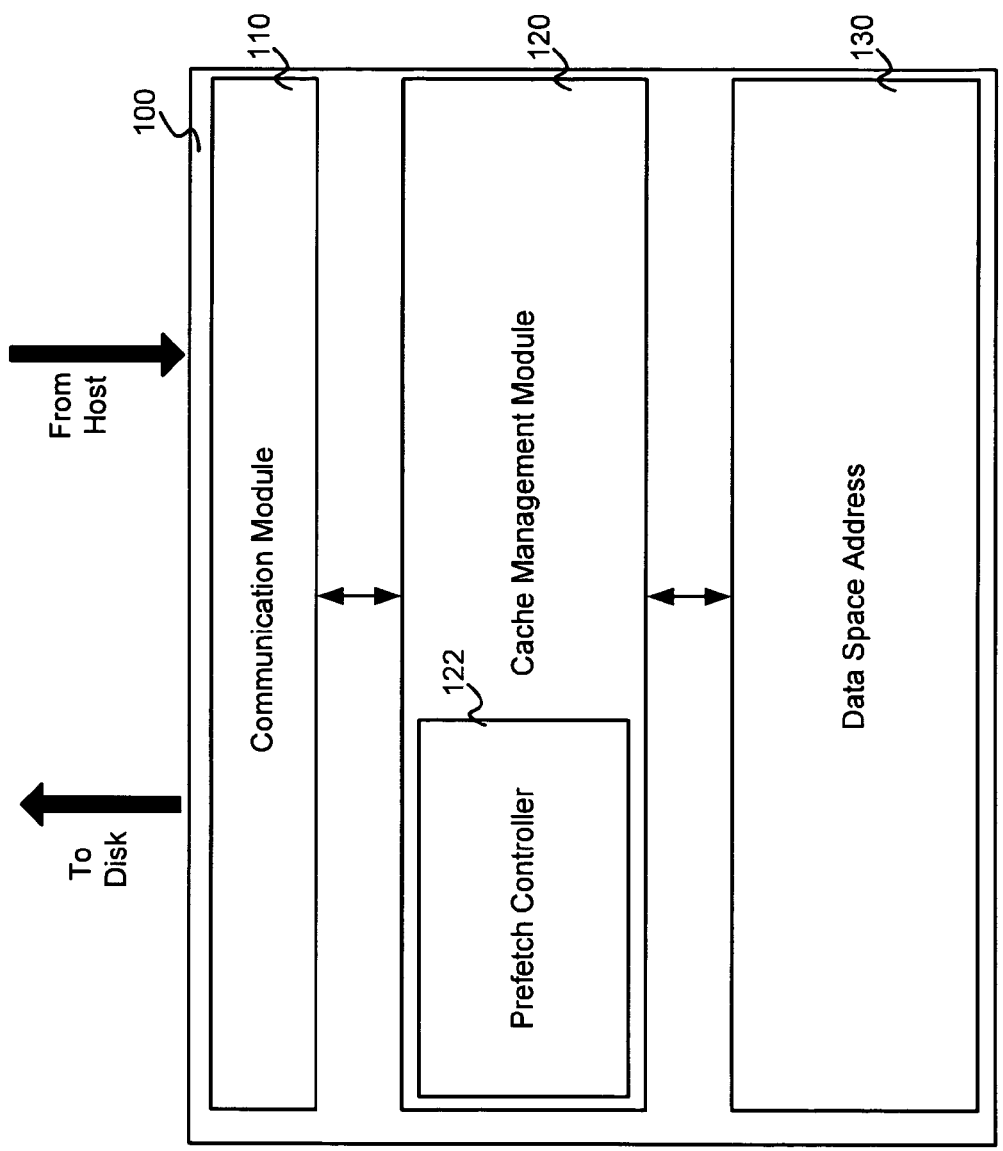
FIG. 1 is a block diagram of a cache memory device, in accordance with some embodiments of the present invention.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions, utilizing terms such as "processing", "computing", "calculating", "determining", "establishing" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to further embodiments of the present invention, there is provided a method of managing the prefetching of data into a cache including triggering a prefetch operation for prefetching one or more data segments into the cache together with at least one segment to be fetched, and establishing what number of segments are to be prefetched at least in accordance with the number of successive segments, if any, already in the cache which are spaced apart by no more than a predetermined number of segments relative to the at least one segment to be fetched.

Further embodiments of the present invention relation to a circuit for managing the prefetching of data into a cache, including a prefetch controller. The prefetch controller may be adapted to trigger a prefetch operation for prefetching one or more data segments into the cache together with at least one segment to be fetched. The prefetch controller may be further adapted to establish what number of segments are to be prefetched at least in accordance with the number of successive segments, if any, already in the cache which are spaced apart by no more than a predetermined number of segments relative to the at least one segment to be fetched.

In accordance with yet further embodiments of the present invention, there is provided a circuit and a method of managing the prefetching of data into a cache. According to some embodiments of the present invention a prefetch controller may be adapted to trigger a prefetch operation for prefetching into the cache one or more data segments together with at least one segment to be fetched. The prefetch controller may be adapted to establish the number of segments to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched. It should be noted, that according to the present invention, the two parts of the criterion, or of similar criteria, used for establishing what number of data segments (or which segment(s)) are to be fetched to which reference is made throughout the specification and the claims, are cumulative, unless specifically stated otherwise or unless implied otherwise.

According to further embodiments of the present invention, the prefetch controller may be adapted to establish what number of segments are to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched, on condition that there is no other one or more segments which are closer (than the single and/or successive segments) relative to the at least one segment to be fetched.

According to a further embodiment of the present invention, the prefetch controller may be adapted to establish the number of segments to be prefetched at least in accordance with the number of successive segments, if any, already in the cache, which are spaced apart by at least one segment but by no more than a predetermined number of segments relative to the at least one segment to be fetched and in accordance with the number of single segments, if any, already in the cache, which are spaced apart by at least one segment but by no more than a predetermined number of segments relative to the at least one segment to be fetched.

According to still further embodiments of the present invention, the prefetch controller may be adapted to establish the number of segments to be prefetched further in accordance with the number of segments already in the cache, which are contiguous with the at least one segment to be fetched. It would be appreciated that if there is more than one segment which is contiguous with the at least one segment to be fetched, i.e. two or more segments, the two or more segments are successive, and any segment which is separated or spaced apart from a segment or a succession of segments which are (is) contiguous with the at least one segment to be fetched is not contiguous with the at least one segment to be fetched.

According to some embodiments of the present invention, the prefetch controller may be adapted to establish which segments are to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched. As part of establishing which segments are to be prefetched, the prefetch controller may identify the segments to be fetched, as will be discussed in further detail below.

It should be noted that the present invention is not limited to any particular prefetch trigger. A prefetch trigger as used herein may mean, unless specifically stated otherwise, a criterion implemented by the cache management module or by the prefetch controller to determine whether to initiate a prefetch process as part of which one or more segments are prefetched into the cache, usually together with one or more other segments which are fetched into the cache or not. One or more of the triggers described in U.S. patent application Ser. No. 60/693,780, Filed on Dec. 29, 2004 commonly assigned to the assignee of the present application, may also be used as part of some embodiments of the present invention. Without limiting the above, according to some embodiments of the present invention, it may be desirable to implement at least one prefetch trigger which is configured to cause a prefetch task to be triggered in case there is at least one segment of data in the cache which complies with the criterion for establishing the number of segments to be fetched (or for establishing which data segments are to be prefetched) and vice-versa. For example, in case the prefetch controller is adapted to establish the number of data segments to be prefetched in accordance with the criterion discussed above, it may be desirable, according to some embodiments of the present invention, to implement a prefetch trigger which is configured to trigger a prefetch task in case there is at least one segment already in the cache which is (are) spaced apart by no more than the predetermined number of segments relative to the at least one segment to be fetched. Additional examples of suitable triggers shall be provided as part of the description of some embodiments of the present invention. It should be noted that other triggers may also be used and that the triggers mentioned herein in connection with a particular criterion for establishing the number of data segments to be prefetched may be used together with other such criteria.

It should be noted that throughout the specification and the claims, the term "spaced apart" is used to describe a relation between segments or units or units wherein the segments or units are separated from one another by at least one segment or unit, as will be described in greater detail below.

Reference is now made to FIG. 1, which is a block diagram of a cache memory device, in accordance with some embodiments of the present invention. As part of some embodiments of the present invention, the cache memory device 100 may include a communication module 110, a cache management module 120 and a data space address 130. The communication module 110, cache management module 120 and the data space address 130 may be realized by using any suitable circuitry and/or software and may of their components may also be realized using any suitable circuitry and/or software.

As part of further embodiments of the present invention, the communication module 110 may be adapted to operatively connect the cache 100 with other components of a mass-storage system of which the cache 100 may be part of (not shown), including but not limited to other cache devices or disks and with hosts and other external entities associated with the mass-storage system. The data space address 130 may be used to store data in the cache 100. Typically, the data space address 130 may be used for temporarily storing in the cache 100 data received from the hosts or from the disks. However, the present invention is not limited in this respect, and the data space address 130 may be used for storing any kind of data for any length of time. In accordance with some embodiments of the present invention, the cache management module 120 may be adapted to manage the operation of the cache 100 and to manage one or more components of the cache 100, including but not limited to the management of fetching and prefetching of data in the cache 100. It should be noted that the generalized description of the cache memory device 100 provided above is exemplary in nature and that the present invention may be implemented as part of any suitable cache memory.

In accordance with some embodiments of the present invention, the cache management module 120 may include a prefetch controller 122. In accordance with some embodiments of the present invention, the prefetch controller 122 may be adapted to manage the prefetching of data into the cache 100 from one or more of the disks associated with the cache 100. In accordance with some embodiments of the present invention, as part of managing the prefetching of data into the cache 100, the prefetch controller 122 may be adapted to determine whether data should be prefetched into the cache 100, and if so, the cache controller 122 may establish the number of data segments that should be prefetched. According to further embodiments of the present invention, the prefetch controller 122 may also be adapted to establish\identify which data segments should be prefetched as part of any prefetch task.

In accordance with some embodiments of the present invention, when the cache management module 120 determines that certain data needs to be fetched from the disk(s), the prefetch controller 122 may be utilized. The prefetch controller 122 may be adapted to determine whether data should be prefetched from the disk(s) together with the data that is to be fetched in accordance with one or more predefined prefetch triggers. As mentioned above, according to some embodiments of the present invention, it may be desirable to implement at least one prefetch trigger which is configured to cause a prefetch task to be triggered in case there is at least one segment of data in the cache which complies with the criterion or criteria used for establishing the number of segments to be fetched (or for establishing which data segments are to be prefetched) and vice-versa. However, any known in the present or yet to be devised in the future suitable prefetch trigger may be used. According to further embodiments of the present invention, in case according to the prefetch trigger the prefetch controller 122 determines that data should be prefetched, the prefetch controller 122 may also be adapted to establish the number of data segments to be prefetched at least in accordance with the number of successive segments, if any, already in the cache 100, which are spaced apart by no more than a predetermined number of segments relative to the at least one segment to be fetched and in accordance with the number of single segments, if any, already in the cache 100, which are spaced apart by no more than a predetermined number of segments relative to the at least one segment to be fetched. In accordance with further embodiments of the present invention, the prefetch controller 122 may be adapted to establish/identify which data is to be prefetched at least in accordance with the number of successive segments, if any, already in the cache 100, which are spaced apart by no more than a predetermined number of segments relative to the at least one segment to be fetched and in accordance with the number of single segments, if any, already in the cache 100, which are spaced apart by no more than a predetermined number of segments relative to the at least one segment to be fetched.

According to some embodiments of the present invention, the prefetch controller 122 may also be adapted to establish the number of data segments to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched, on condition that there is no other one or more segments which are closer than the single and/or successive segments relative to the at least one segment to be fetched. In accordance with further embodiments of the present invention, the prefetch controller 122 may be adapted to establish/identify which data is to be prefetched at least in accordance with the number of successive segments, if any, already in the cache, which are spaced apart by no more than a predetermined number of segments relative to the at least one segment to be fetched and in accordance with the number of single segments, if any, already in the cache, which are spaced apart by no more than a predetermined number of segments relative to the at least one segment to be fetched, on condition that there is no other one or more segments which are than the single and/or successive segments relative to the at least one segment to be fetched.

In the field of mass-storage systems, and other data systems, one or more units of data may defined in the storage system and are indexed for purposes of data management, data traffic, data transfer, scaling, etc. Thus, each data unit in the system is associated with one or more indicia. For example, in Storage Area Networks (SAN), several data units may be defined and indexed including the following: Logical Unit or Logical Volume (LU)—a LU is a string of consecutive blocks indicated by logical block addresses (LBAs) starting from 0 and going up to N, where N is the size of the LU; Partitions—a partition is a subunit of a LU and is comprised of a string of consecutive blocks which correspond to a certain segment of the LU which the partition is part of. Partitions are indexed units and are commonly defined for purposes of internal management of data in the system. Thus, a LU consists of consecutive partitions; Allocation units—an allocation unit, as mentioned above, relates to an allocatable unit of cache storage space which may be allocated by a cache or by a cache's controller for storing data within the allocated storage space. In some storage systems, each allocation unit in the cache corresponds to one (whole) partition of the storage system. In other storage systems, such as the one described in U.S. Provisional Patent Application No. 60/639,780, filed Dec. 29, 2004 and in U.S. patent application Ser. No. 11/123,633 filed, May 6, 2005, allocation units are sub-units of a partition comprised of a string of consecutive blocks which correspond to a certain segment of the partition, of which the allocation units are part of (and are therefore smaller than partitions). In this case, partitions are strings of consecutive allocation units, and each allocation unit is a string of consecutive blocks; and Data blocks—data blocks are the basic unit of data used by the SAN systems. Each data block is a predefined number of bits or bytes in size, and each data block is associated with a unique LBA. It should be noted that the present invention is applicable also to other storage systems, such as for example, NAS systems. Those of ordinary skill in the art will readily appreciate how to modify various aspects of some embodiments of the present invention for implementation thereof in other storage systems.

Throughout the specification and the claims, any reference made to a relation between data segments or data units, including but not limited to the following relations: "spaced apart by no more than a predetermined number of segments/units/blocks", "spaced apart by at least one segment/unit/block but by no more than a predetermined number of segments/units/blocks", "contiguous", "contiguous with", "closer to", "succeeding", "following", "preceding" and the like, may be used to describe a corresponding relation between the respective indices of two or more data segments or data units in a cache storage memory.

In accordance with some embodiments of the present invention, the relation and/or distance between the data to be fetched and any of the data segments in the cache 100 may be determined in accordance with the indicia associated with each of the data segments. According to some embodiments of the present invention, the prefetch controller 122 may be adapted to use such indicia to establish what number of data segments is to be prefetched into the cache 100 and/or to establish/identify which data segment(s) is (are) to be prefetched into the cache 100. According to yet further embodiments of the present invention, the prefetch trigger which may be utilized by the prefetch controller 122 may refer to such indicia for determining whether any data should be prefetched together with the data to be fetched.

Throughout the description of some embodiments of the present invention, reference may be made to various specific data units or data segments, such as, for example, data blocks, which may serve as the data unit or segment of reference used by the prefetch controller 122. It should be noted however, that embodiments of the present invention, may not be limited to the use of any particular data unit or segment as the data unit or segment of reference used by the prefetch controller 122, rather any known in the present or yet to be devised in the future unit may serve as the unit of reference, either exclusively or jointly (e.g., alternatively) with other units. Examples of units may include, for example, but are not limited to: partitions, discrete data blocks, groups of data blocks having a predefined size, a cache allocation unit (for example, such as the one disclosed in U.S. patent application Ser. No. 11/123,633 filed, May 6, 2005) or in U.S. Provisional Patent Application No. 60/639,780, filed Dec. 29, 2004, and the like.

Figure 2:
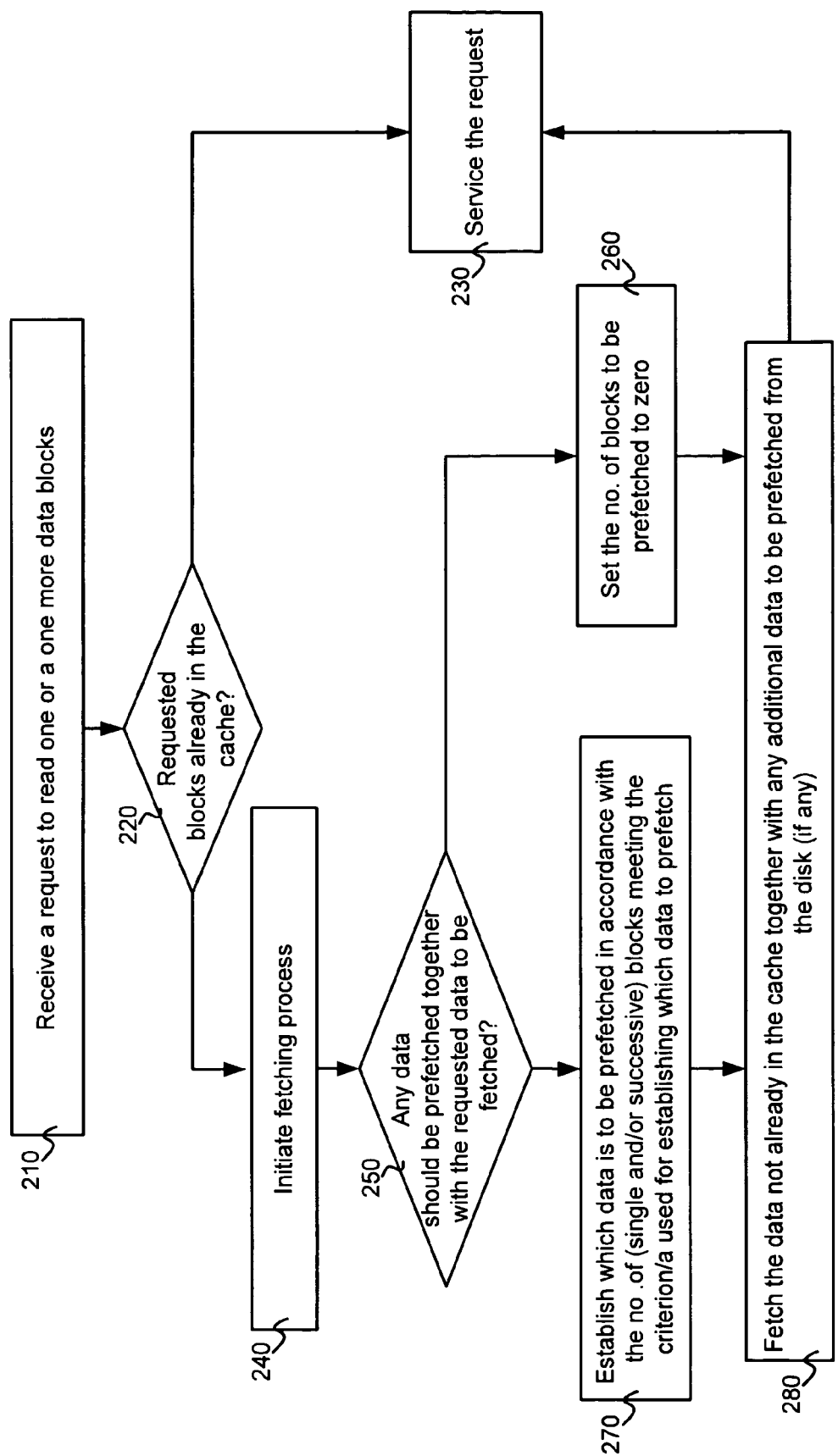
FIG. 2 is a flowchart illustration of some of a method of managing a cache memory in a mass storage system, in accordance with some embodiments of the present invention.

Reference is now additionally made to FIG. 2, which is a flowchart illustration of some aspects of a method of managing a cache memory in a mass storage system, in accordance with some embodiments of the present invention. As part of some embodiments of the present invention, initially a request may be received at the cache 100, for example, from a host, to read one or a string of data blocks (two or more successive blocks) (block 210). In accordance with some embodiments of the present invention, upon receiving the request, the cache management module 120 may determine whether the requested data is already stored in the cache 100 or not (block 220).

In accordance with some embodiments of the present invention, in case it is determined that the requested data blocks are already in the cache 100, the cache management module 120 may retrieve the data blocks from the data space address 130 and may service the request (block 230), for example, by transmitting the requested data to the host which requested the data through the communication module 110. However, in case it is determined that one or more of the requested data blocks are not currently in the cache 100, the cache management module 120 may initiate a fetching process (block 240) in order to bring the requested data blocks into the cache 100. In accordance with some embodiments of the present invention, as part of the fetching process, the cache management module 120 may be adapted to fetch the requested data blocks not found in the cache 100 from an external data source, such as, for example, a permanent storage device (e.g., a disk storage device) on which the requested data blocks (which are not currently in the cache 100) may be stored.

In accordance with some embodiments of the present invention, following the conclusion that the requested data blocks need to be brought from the disk(s), for example, the cache management module 120 may utilize the prefetch controller 122 to determine whether any (additional) data blocks should be prefetched together with the requested data blocks to be fetched (block 250). In accordance with some embodiments of the present invention, as part of determining whether any data blocks should be prefetched together with the data to be fetched, the prefetch controller 122 may be adapted to utilize one or more prefetch triggers. According to some embodiments of the present invention, at least one of the prefetch triggers utilized by the prefetch control 122 may be configured to cause a prefetch task to be triggered in case there is at least one segment of data in the cache which complies with the criterion for establishing the number of segments to be fetched implemented by the prefetch controller 122. Some examples of specific prefetch triggers which may be utilized by the prefetch controller 122 to determine when to initiate a prefetch task are provided throughout the description of the present invention.

In accordance with some embodiments of the present invention, in case it is determined in accordance with the prefetch trigger that no data should be prefetched, the number of blocks to be prefetched may be set to zero (block 260). For example, if, in accordance with the prefetch trigger, a prefetch task is to be triggered if there is at least one block already in the which is spaced apart by no more than a predetermined number of blocks from the blocks to be fetched, and it is determined that the cache 100 does not currently hold any blocks which are spaced apart by no more than the predetermined number of blocks from the blocks to be fetched, a prefetch task will not be created and no data shall be prefetched together with the data to be fetched. The cache management module 120 may then proceed to fetch from the disk(s) the requested data which is not already in the cache 100 (block 290). Once the requested data is in the cache 100 (after being brought from the disk(s) in this case), the cache 100 may service the request (block 230).

In accordance with some embodiments of the present invention, in case a prefetch task is triggered, the prefetch controller 122 may be configured to establish what number of data blocks (or other data segments or units) are to be prefetched together with the data to be fetched at least in accordance with the number of successive blocks, if any, already in the cache 100, which are spaced apart by no more than a predetermined number of blocks relative to the at least one block to be fetched and in accordance with the number of single blocks, if any, already in the cache 100, which are spaced apart by no more than a predetermined number of blocks relative to the at least one block to be fetched. According to further embodiments of the present invention, in case a prefetch task is triggered, the prefetch controller 122 may be configured to establish which one or more data blocks are to be prefetched at least in accordance with the number of successive blocks, if any, already in the cache 100, which are spaced apart by no more than a predetermined number of blocks relative to the at least one block to be fetched and in accordance with the number of single blocks, if any, already in the cache 100, which are spaced apart by no more than a predetermined number of blocks relative to the at least one block to be fetched (block 270). In accordance with further embodiments of the present invention, the prefetch controller 122 may establish which one or more blocks are (is) to be prefetched from the disk(s) in accordance with the number of blocks (one or more) meeting the prefetch criteria.

In accordance with some embodiments of the present invention, once the prefetch controller 122 establishes which one or more data blocks are to be prefetched from the disk(s), the prefetch controller 122 may indicate to the cache management module 120 which one or more data blocks to prefetch from the disk(s). The cache management module 120 may then proceed to fetch from the disk(s) the requested one or more data blocks which are (is) not already in the cache 100 together with any additional data to be prefetched from the disk(s) (block 280), as indicated by the cache management module 122. Once the requested data blocks are in the cache 100 (after being brought from the disk(s)), the cache 100 may service the request (block 230).

In accordance with yet further embodiments of the present invention, as part of establishing which data is to be prefetched, the prefetch controller 122 may be configured to look onto only more specific data blocks which are spaced apart by no more than a predetermined number of blocks relative to the block(s) to be fetched. For example, in accordance with some embodiments of the present invention, the prefetch controller 122 may be configured to establish which data is to be prefetched at least in accordance with the number of successive blocks, if any, already in the cache, which precede the one or more data blocks to be fetched and which are spaced apart from the data blocks to be fetched by no more than a predetermined number of blocks and in accordance with the number of single blocks, if any, already in the cache, which precede the one or more data blocks to be fetched and which are spaced apart from the data blocks to be fetched by no more than a predetermined number of blocks.

According to a further embodiments of the present invention, the prefetch controller 122 may be configured to establish which data is to be prefetched at least in accordance with the number of successive blocks, if any, already in the cache, which succeed the one or more data blocks to be fetched and which are spaced apart from the data blocks to be fetched by no more than a predetermined number of blocks and in accordance with the number of single blocks, if any, already in the cache, which succeed the one or more data blocks to be fetched and which are spaced apart from the data blocks to be fetched by no more than a predetermined number of blocks, on condition that there is at least a certain number (e.g. two) of such data blocks in the cache 100.

In accordance with yet further embodiments of the present invention, the prefetch controller 122 may be configured to establish which data is to be prefetched at least in accordance with the number of successive blocks, if any, already in the cache, which succeed the one or more data blocks to be fetched and which are spaced apart from the data blocks to be fetched by no more than a predetermined number of blocks and in accordance with the number of single blocks, if any, already in the cache, which succeed the one or more data blocks to be fetched and which are spaced apart from the data blocks to be fetched by no more than a predetermined number of blocks.

In accordance with some embodiments of the present invention, the prefetch controller 122 may be configured to determine which data is to be prefetched in accordance with further criterion\a in addition to the number of consecutive data blocks in the cache 100 being spaced apart by no more than a predetermined number of blocks from the data to be fetched or in addition to similar criteria, as discussed above and hereinbelow. Examples of various criteria which may be used by the prefetch controller 122 to determine if and which data is to be prefetched shall be provided and discussed in greater detail hereinbelow.

Figure 3A:
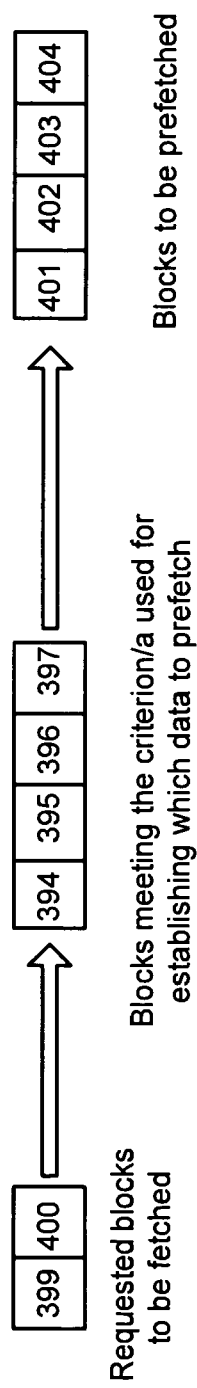
FIG. 3A is a block diagram illustration of one exemplary criterion which may be used by the prefetch controller to establish which data segments should be prefetched together with the requested data to be fetched and/or to determine whether any data should be prefetched together with the requested data to be fetched, according to some embodiments of the present invention.

Reference is now made to FIG. 3A, which is a block diagram illustration of one exemplary criterion which may be used by the prefetch controller to establish which data should be prefetched together with the requested data to be fetched and/or to determine whether any data should be prefetched together with the requested data to be fetched, according to some embodiments of the present invention. In the description of the embodiments illustrated in FIG. 3A, we assume that the process of determining whether any data should be prefetched and the process of establishing which data is to be prefetched are separate processes, however it should be noted that the present invention is not limited in this respect, and that according to further embodiments of the present invention, the prefetch controller may be adapted to determine whether any data should be prefetched and which data is to be prefetched as part of a single unified process.

In FIG. 3A, requested blocks 399 and 400 are not found in the cache 100, and therefore need to be fetched, for example, from a disk storage device. According to some embodiments of the present invention, as part of initiating the fetching process, the cache management module 120 may utilize the prefetch controller 122 to determine whether any data should be prefetched together with the requested blocks to be fetched, blocks 399 and 400. The prefetch controller 122 may utilize a predefined prefetch trigger in order to determine whether to prefetch data from the cache or not. According to an exemplary embodiment of the present invention, the prefetch controller 122 may be adapted to determine in accordance with a predefined prefetch trigger whether there are any blocks already stored in the cache 100 which precede the data to be fetched (blocks 399 and 400) and which are spaced apart from the data to be fetched by no more than a predetermined number of blocks, for example, by no more than five blocks. In the embodiments shown in FIG. 3A, blocks 394-397 which precede the data to be fetched are already stored in the cache 100 and are spaced apart from the data to be fetched (blocks 399 and 400) by no more than the predetermined number of blocks (5 in this case).

In FIG. 3A, we assume that, for example, the prefetch controller 122 is adapted to prefetch data together with the requested data to be fetched in case there is at least one block in the cache which precedes the requested blocks to be fetched and which is spaced apart from the blocks to be fetched by no more than a predetermined number of blocks, for example, by no more than five blocks. Therefore, in accordance with some embodiments of the present invention, and since blocks 394-397, which precede requested blocks 399 and 400, are already in the cache and are spaced apart by no more than five blocks from the requested blocks to be fetched, block 399 and 400, the prefetch controller 122 may determine that some data needs to be prefetched together with the requested blocks to be fetched, blocks 399 and 400 and may thus initiate a prefetch task.

In FIG. 3A, we further assume that the prefetch control module 122 is configured to establish which data blocks are to be prefetched at least in accordance with the number of successive blocks, if any, already in the cache, which precede the requested data blocks to be fetched, and which are spaced apart by no more than a predetermined number of blocks (five blocks in this case) relative to the at least one block to be fetched and in accordance with the number of single blocks, if any, already in the cache, which precede the requested data blocks to be fetched, and which are spaced apart by no more than a predetermined number of blocks relative to the at least one block to be fetched. For example, in accordance with the criterion/a implemented by the prefetch controller 122 for establishing which data to prefetch, the prefetch controller 122 may be configured to instruct the cache management module 120 to prefetch for each of single block and each succession of blocks already in the cache 100 which precede(s) the requested blocks to be fetched and which are (is) spaced apart by no more than a predetermined number of blocks from the requested blocks to be fetched, the next available block (from the disk(s)) succeeding the data blocks to be fetched. In the scenario shown in FIG. 3A, in accordance with this criterion, the prefetch controller 122 will instruct the cache management module 120 to prefetch for each of the four blocks 394-397 meeting the criterion, the next available block succeeding the data to be fetched, in this case a total of four blocks 401-404, wherein each of the four blocks to be prefetched 401-404 corresponds to one of the four blocks meeting the criterion (blocks 394-397).

FIG. 3A may aid in understanding some of the advantages of using compatible criteria for determining whether (any) data should be prefetched and for establishing which data (or what number of data segments) should be prefetched. It should be noted, that the present invention is not limited in this respect.

Figure 3B:
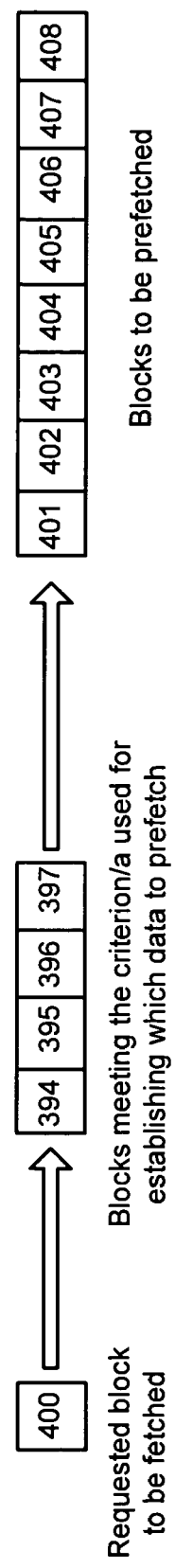
FIG. 3B is a block diagram illustration of one exemplary criterion which may be used by the prefetch controller to determine whether any data should be prefetched together with the requested data to be fetched and of another exemplary criterion which may be used by the prefetch controller to establish which data segments should be prefetched together with the requested data to be fetched, according to some embodiments of the present invention.

Reference is now made to FIG. 3B, which is a block diagram illustration of one exemplary criterion which may be used by the prefetch controller to determine whether any data should be prefetched together with the requested data to be fetched and of another exemplary criterion which may be used by the prefetch controller to establish which data should be prefetched together with the requested data to be fetched, according to some embodiments of the present invention. In FIG. 3B, requested block 400 is not found in the cache 100, and therefore needs to be fetched, for example, from a disk storage device.

In FIG. 3B, the same criterion as in FIG. 3A is implemented by the prefetch controller to determine whether any data should be prefetched, i.e. prefetch data if there is at least one block in the cache which precedes the requested block (block 400) to be fetched and which is spaced apart from the block to be fetched by no more than a predetermined number of blocks, for example, by no more than five blocks. The fact that the requested data to be fetched in FIG. 3B is one block in size does not effect this criterion.

However, in the embodiments shown in FIG. 3B, the criterion implemented by the prefetch controller 122 to establish which data should be prefetched is different from the one shown and discussed with reference to FIG. 3A. In the embodiments of the present invention shown in FIG. 3B, the prefetch controller 122 may be configured to instruct the cache management module 120 to prefetch for each of the one or more successive segments, if any, already in the cache, which are spaced apart by no more than a predetermined number of segments relative to the at least one segment to be fetched and for each of the single segments, if any, already in the cache, which are spaced apart by no more than a predetermined number of segments relative to the at least one segment to be fetched, the next available two blocks (from the disk(s)) succeeding the data to be fetched. In the scenario shown in FIG. 3B, in accordance with this criterion, the prefetch controller 122 will instruct the cache management module 120 to prefetch for each of the four blocks 394-397 meeting the criterion, the next two available blocks succeeding the data to be fetched, in this case a total of eight blocks 401-408, wherein each two of the eight blocks to be prefetched 401-408 corresponds to one of the four blocks meeting the criterion (blocks 394-397).

Figure 3C:
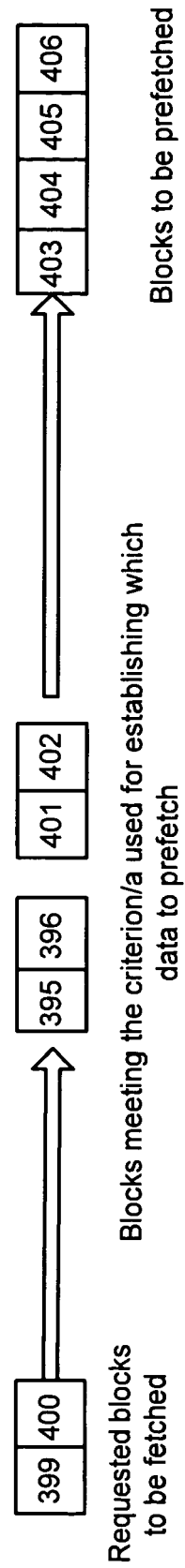
FIG. 3C is a block diagram illustration of one exemplary criterion which may be used by the prefetch controller to establish which data segments should be prefetched together with the requested data to be fetched and/or to determine whether any data should be prefetched together with the requested data to be fetched.

Reference is now made to FIG. 3C, which is a block diagram illustration of one exemplary criterion which may be used by the prefetch controller to establish which data should be prefetched together with the requested data to be fetched and/or to determine whether any data should be prefetched together with the requested data to be fetched, according to some embodiments of the present invention, in addition to another criterion.

In FIG. 3C, requested blocks 399-400 are not found in the cache 100, and therefore need to be fetched, for example, from a disk storage device. According to some embodiments of the present invention, the prefetch controller 122 may be utilized to determine whether any data should be prefetched together with the requested blocks to be fetched, blocks 399-400. In accordance with some embodiments of the present invention, in FIG. 3C, as part of determining whether any data should be prefetched, the prefetch controller 122 may be adapted to determine whether there is at least one block in the cache 100 which is spaced apart from the data to be fetched by no more than a predefined number of blocks, for example, by no more than five blocks. In the embodiments shown in FIG. 3C successive blocks, blocks 395-396 are already in the cache 100 and are spaced apart from the requested blocks to be fetched by no more than the predetermined number of blocks. The prefetch controller 122 may therefore trigger a prefetch task. In the embodiments shown in FIG. 3C, the prefetch controller 122 may be configured with at least one more prefetch trigger in addition to the trigger discussed above, and according to the additional prefetch trigger a prefetch task should be triggered in case there is at least one block of data in the cache which is contiguous with the requested data blocks to be fetched. In accordance with an embodiment of the present invention, the two triggers may operate independently of each other, such that a prefetch task is initiated if either (or both) triggers are triggered.

Similarly, the prefetch controller 122 shown in FIG. 3C is configured to establish which data to prefetch in accordance with two different cumulative criteria. In the embodiment shown in FIG. 3C, the prefetch controller 122 is configured to establish which data to prefetch the number of successive blocks, if any, already in the cache, which are spaced apart by no more than a predetermined number of blocks relative to the at least one block to be fetched and in accordance with the number of single blocks, if any, already in the cache, which are spaced apart by no more than a predetermined number of blocks relative to the at least one block to be fetched, and also in accordance with the number of blocks in the cache 100 which are contiguous with the data blocks to be fetched. In the embodiments shown in FIG. 3C, the prefetch controller 122 may be adapted to prefetch for each of the successive blocks, if any, already in the cache, which are spaced apart by no more than a predetermined number of blocks (for example, five blocks) relative to the at least one block to be fetched and for each of the single blocks, if any, already in the cache, which are spaced apart by no more than a predetermined number of blocks (for example, five blocks) relative to the at least one block to be fetched, the next available block (from the disk(s)) succeeding the data to be fetched, and also, in addition, to prefetch for each of the one or more blocks already in the cache 100 which are contiguous with the data to be fetched, the next available block succeeding the data to be fetched. In the scenario shown in FIG. 3C, in accordance with these criteria, the prefetch controller 122 will instruct the cache management module 120 to prefetch for the two successive blocks already in the cache and which are spaced apart by no more than the predetermined number of blocks (five) from the blocks to be fetched (blocks 395-396) two blocks, and for the two blocks already in the cache which are contiguous with the blocks to be fetched (blocks 401-402) two more blocks, and together the next four available blocks succeeding the data to be fetched, in this case, the four blocks succeeding block 402 (which is already in the cache 100), i.e. blocks 403-406.

It would be appreciated, that the use of the two cumulative criteria by the prefetch controller 122 of FIG. 3C, as was discussed above, yields different results than the results which would have been obtained, had either of the two criteria been used exclusively.

Below is a description of additional criteria which may be used by the prefetch controller to establish the number of data blocks/segments (or which data blocks/segments) to prefetch together with the data to be fetched. It should be noted that this list is not exhaustive and that some embodiments of the present invention cover various other criteria. Although the prefetch criterion may be utilized only after a prefetch task has been triggered, it should be noted that according to further embodiments of the present invention the prefetch trigger may be omitted and the prefetch controller may be configured to trigger a prefetch task when in accordance with the prefetch criterion or criteria it is established that there is at least one block (or segment) meeting the criterion or criteria used for establishing the number of data blocks/segments (or which data blocks/segments) to prefetch.

According to one embodiment of the present invention, the prefetch controller 122 may be adapted to establish which data is to be prefetched in accordance with the number of successive blocks, if any, in the cache, which precede the data to be fetched, and which are spaced apart by no more than a predetermined number of blocks relative to the at least one block to be fetched and which have also been accessed while in the cache 100, and in accordance with the number of single blocks, if any, in the cache, which precede the data to be fetched, and which are spaced apart by no more than a predetermined number of blocks relative to the at least one block to be fetched and which have also been accessed while in the cache 100. In accordance with this criterion, the prefetch controller 122 may consider only blocks (one or more) already stored in the cache which precede the requested data to be fetched and which are spaced apart from the data to be fetched by no more than a predetermined number of blocks and which have also been accessed while in the cache 100. This criterion may be easily adapted to conform with other relationships between the data to be fetched and the data which is already in the cache, and which is spaced apart by no more than the predetermined number of blocks from the data to be fetched, including, but not limited to, succeeding the blocks to be prefetched and/or preceding the blocks to be fetched.

According to some embodiments of the present invention, the prefetch controller 122 may be adapted to establish which data is to be prefetched or which blocks are to be prefetched in accordance with the number of successive blocks, if any, of which there is at least a predefined percentage of successive blocks which are already in the cache, which are spaced apart by no more than a predetermined number of blocks relative to the at least one block to be fetched and single blocks, if any, already in the cache, which are spaced apart by no more than a predetermined number of blocks relative to the at least one block to be fetched, and in accordance with a further embodiment, which have also been accessed while in the cache 100.

According to further embodiments of the present invention, the prefetch controller 122 may be adapted to establish which data is to be prefetched or which blocks are to be prefetched in accordance with the number of successive blocks, if any, already in the cache, which are spaced apart by no more than a predetermined number of blocks relative to the at least one block to be fetched and which have also been accessed at least a predetermined number of times while in the cache 100 and in accordance with the number of single blocks, if any, already in the cache, which are spaced apart by no more than a predetermined number of blocks relative to the at least one block to be fetched and which have also been accessed at least a predetermined number of times while in the cache 100.

According to yet further embodiments of the present invention, the prefetch controller 122 may be adapted to establish which data blocks are to be prefetched in accordance with the number of successive blocks, if any, already in the cache, which are spaced apart by no more than a predetermined number of blocks relative to the at least one block to be fetched and which have been accessed in succession while in the cache 100 and in accordance with the number of single blocks, if any, already in the cache, which are spaced apart by no more than a predetermined number of blocks relative to the at least one block to be fetched and which have been accessed in succession while in the cache 100.

According to yet further embodiments of the present invention, the prefetch controller 122 may be adapted to establish which data is to be prefetched or which blocks are to be prefetched in accordance with the number of successive blocks, if any, already in the cache, which are spaced apart by no more than a predetermined number of blocks relative to the at least one block to be fetched and which have been accessed within a predefined period of time (while in the cache) and in accordance with the number of single blocks, if any, already in the cache, which are spaced apart by no more than a predetermined number of blocks relative to the at least one block to be fetched and which have been accessed within a predefined period of time (while in the cache).

According to some embodiments of the present invention, the prefetch controller 122 may be adapted to establish which data is to be prefetched or which blocks are to be prefetched in accordance with the number of successive blocks, if any, already in the cache, which are spaced apart by no more than a predetermined number of blocks relative to the at least one block to be fetched and which have been accessed at least a predetermined number of times (while in the cache) and in accordance with the number of single blocks, if any, already in the cache, which are spaced apart by no more than a predetermined number of blocks relative to the at least one block to be fetched and which have been accessed at least a predetermined number of times (while in the cache).

According to some embodiments of the present invention, the prefetch controller 122 may be adapted to establish which data is to be prefetched or which blocks are to be prefetched in accordance with the number of successive blocks, if any, already in the cache, which are spaced apart by no more than a predetermined number of blocks relative to the at least one block to be fetched and which belong to the same storage unit or to the same mass storage unit (e.g., to the same partition, to the same allocation unit, etc.) as the data to be fetched and in accordance with the number of single blocks, if any, already in the cache, which are spaced apart by no more than a predetermined number of blocks relative to the at least one block to be fetched and which belong to the same storage unit or to the same mass storage unit (e.g., to the same partition, to the same allocation unit, etc.) as the data to be fetched.

According to some embodiments of the present invention, the prefetch controller 122 may be adapted to establish which data is to be prefetched or which data units are to be prefetched in accordance with the number of successive blocks, if any, already allocated and/or stored in the cache, which are spaced apart by no more than a predetermined number of blocks relative to the at least one block to be fetched and in accordance with the number of single blocks, if any, already allocated and/or stored in the cache, which are spaced apart by no more than a predetermined number of blocks relative to the at least one block to be fetched. Thus, for example, the prefetch controller 122 may also consider, for example, blocks which have been requested from the disk (and which have consequently been allocated in the cache 100) but which have not yet arrived at the cache 100 (and consequently have not yet been stored therein).

As mentioned above, although the present invention is not limited in this respect, according to some embodiments of the present invention, the prefetch trigger utilized by the prefetch controller 122 may be compatible with the criterion/a used by the prefetch controller 122 to establish the number of segments/blocks to be prefetched. Provided below are some examples of prefetch triggers which may be compatible with some of the criterion/a which may be used by the prefetch controller to establish the number of segments/blocks to be prefetched, in accordance with some embodiments of the present invention.

According to some embodiments of the present invention, the prefetch controller 122 may be adapted to determine that data is to be prefetched in case there is at least one block already stored in the cache 100 which precedes the data block(s) to be fetched and which are spaced apart from the data blocks to be fetched by no more than a predetermined number of blocks and if the at least one of these blocks was accessed while in the cache 100. In accordance with this criterion the prefetch controller 122 may not initiate a prefetch task unless there is at least one block already in the cache 100 preceding the data to be fetched, which is spaced apart by no more than a predetermined number of blocks from the data to be fetched and which has been accessed while in the cache 100.

According to further embodiments of the present invention, the prefetch controller 122 may be adapted to determine that data should be prefetched together with the requested data only if at least a predefined percentage of blocks which are spaced apart by no more than a predetermined number of blocks from the data to be fetched are already stored in the cache 100, and in accordance with a further embodiment, which have also been accessed while in the cache 100.

According to yet further embodiments of the present invention, the prefetch controller 122 may be adapted to determine that data should be prefetched together with the requested data only if there is at least one block already stored in the cache which is spaced apart by no more than a predetermined number of blocks from the requested data to be fetched, and which have been accessed at least a predetermined number of times while in the cache 100.

According to some embodiments of the present invention, the prefetch controller 122 may be adapted to determine that data should be prefetched together with the requested data only if there is at least two blocks already in the cache which are spaced apart by no more than a predetermined number of blocks from the data to be fetched and which have been accessed in succession while in the cache 100.

According to some embodiments of the present invention, the prefetch controller 122 may be adapted to determine that data should be prefetched together with the requested data only if there is at least one data block in the cache which is spaced apart by no more than a predetermined number of blocks from the data to be fetched and which has been accessed within a predefined period of time (while in the cache).

According to some embodiments of the present invention, the prefetch controller 122 may be adapted to determine that data should be prefetched together with the requested data only if there is at least one data block already in the cache which is spaced apart by no more than a predetermined number of blocks apart from the requested data to be fetched and which has been accessed at least a predefined number of times (while in the cache).

According to some embodiments of the present invention, the prefetch controller 122 may be adapted to determine that data should be prefetched together with the requested data only if there is at least one data block in the cache which is spaced apart by no more than a predetermined number of blocks apart from the requested data to be fetched and which belongs to the same storage unit or to the same mass storage unit (e.g., to the same partition, to the same allocation unit, etc.) as the data to be fetched.

According to some embodiments of the present invention, the prefetch controller 122 may be adapted to determine that data should be prefetched together with the requested data only if there is at least one unit which has already been allocated and/or stored in the cache 100 and which is spaced apart by no more than a predetermined number of units from the requested data to be fetched.

According to some embodiments of the present invention, the prefetch controller 122 may be configured to create a prefetch task or to instruct the cache management module 120 to create a prefetch task only in case it establishes that the amount of data to be prefetched, as established by the prefetch controller 122 in accordance with the criterion used to establish which data is to be prefetched, exceeds a predetermined (minimum) threshold. Similarly, according to further embodiments of the present invention, the prefetch controller 122 may be configured to cause only up-to a predetermined amount of data to be prefetched as part of any one prefetch task in accordance with a predefined (maximum) threshold.

It will also be understood that the device according to some embodiments of the present invention may be a suitably programmed computer. Likewise, some embodiments of the present invention, contemplate a computer program being readable by a computer for executing the method of the invention. Further embodiments of the present invention contemplate a machine-readable memory tangibly embodying a program of instructions executable by the machine for executing the method of the invention.

While certain features of the invention have been illustrated and described herein, many modifications, substitutions, changes, and equivalents will occur to those skilled in the art. It is, therefore, to be understood that the appended claims are intended to cover all such modifications and changes as fall within the true spirit of the invention.

The invention claimed is:

1. A method for cache management, comprising:
providing a prefetching policy, which specifies a spacing between data segments and a factor of proportionality;
receiving a request from a host to read a specified data segment, which is stored on a storage device;
checking a cache associated with the storage device so as to ascertain a first number of the data segments held in the cache that precede the specified data segment by no more than the specified spacing;
fetching the specified data segment from the storage device to the cache together with a second number of the data segments, equal to the first number multiplied by the specified factor, that succeed the specified data segment; and
serving the specified data segment to the host.

2. The method according to claim 1, wherein the specified factor is one.

3. The method according to claim 1, wherein the specified factor is two.

4. The method according to claim 1, wherein checking the cache comprises including in the first number a third number of the data segments that precede the specified data segment by no more than the specified spacing and occur in succession.

5. The method according to claim 1, wherein checking the cache comprises including in the first number a third number of the data segments that precede the specified data segment by no more than the specified spacing and occur singly.

6. The method according to claim 1, and comprising checking the cache to ascertain a third number of the data segments held in the cache that contiguously succeed the specified data segment, and fetching from the storage device, together with the specified data segment, a fourth number of the data segments, proportional to the third number, succeeding the specified data segment.

7. The method according to claim 1, wherein providing the prefetching policy comprises specifying an access policy with respect to past access to the data segments in the cache, and wherein checking the cache comprises deciding, responsively to the access policy, whether to count in the first number the data segments that precede the specified data segment.

8. The method according to claim 7, wherein the access policy specifies that only the data segments that have been accessed while held in the cache are to be counted in the first number.

9. The method according to claim 8, wherein the access policy specifies at least one criterion with respect to a time of access or a number of accesses that is to be applied in determining whether to count the data segments in the first number.

10. The method according to claim 1, wherein receiving the request comprises checking whether the specified data segment is already held in the cache upon receiving the request, and triggering a prefetch task that comprises fetching the second number of the data segments only if the specified data segment is not in the cache.

11. The method according to claim 10, wherein triggering the prefetch task comprises verifying that there is at least one data segment preceding the specified data segment in the cache by no more than the specified spacing before initiating the prefetch task.

12. The method according to claim 1, wherein the data segments correspond to mass-storage system data units of a type selected from a group of data unit types consisting of logical units, partitions, allocation units and data blocks.

* * * * *